United States Patent
Cui et al.

(10) Patent No.: US 11,610,396 B2
(45) Date of Patent: Mar. 21, 2023

(54) LOGO PICTURE PROCESSING METHOD, APPARATUS, DEVICE AND MEDIUM

(71) Applicant: BEIJING BAIDU NETCOM SCIENCE AND TECHNOLOGY CO., LTD., Beijing (CN)

(72) Inventors: Cheng Cui, Beijing (CN); Kai Wei, Beijing (CN); Min Yang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 41 days.

(21) Appl. No.: 17/375,468

(22) Filed: Jul. 14, 2021

(65) Prior Publication Data
US 2022/0207286 A1    Jun. 30, 2022

(30) Foreign Application Priority Data
Dec. 25, 2020  (CN) .......................... 202011558007.7

(51) Int. Cl.
*G06K 9/00* (2022.01)
*G06V 20/00* (2022.01)
(Continued)

(52) U.S. Cl.
CPC ............ *G06V 20/00* (2022.01); *G06F 16/532* (2019.01); *G06F 16/56* (2019.01);
(Continued)

(58) Field of Classification Search
CPC ..... G06K 9/6215; G06F 16/532; G06F 16/56; G06F 16/5846; G06V 10/22; G06V 10/40; G06V 30/10; G06V 2201/09
See application file for complete search history.

(56) References Cited

U.S. PATENT DOCUMENTS 9,720,934 B1 *  8/2017  Dube ...................... G06F 18/24
10,007,863 B1 *  6/2018  Pereira ................. G06V 10/764
(Continued)

FOREIGN PATENT DOCUMENTS

| CN | 112115950 A | * | 12/2020 | ............. G06K 9/344 |
| CN | 112115950 A |   | 12/2020 | |
| WO | WO-2015042140 A1 | * | 3/2015 | ......... G06Q 30/0242 |

OTHER PUBLICATIONS

Applying algebraic and differential invariants for logo recognition, D. Doermann et al., Springer, 1996, pp. 73-86 (Year: 1996).*

(Continued)

*Primary Examiner* — Jayesh A Patel
(74) *Attorney, Agent, or Firm* — Brooks Kushman P.C.

(57) ABSTRACT

The present disclosure provides a logo picture processing method, apparatus, device and medium, and relates to technical field of image processing, and specifically to the technical field of artificial intelligence such as deep learning and computer vision. The logo picture processing method includes: obtaining a logo picture including: a current logo graph and current text information; performing text recognition on the logo picture to obtain the current text information; searching for a picture that matches both the current logo graph and the current text information, to obtain a matched picture. The present disclosure may improve the accuracy of the matched picture of the logo picture and thereby improve the logo picture recognition accuracy.

15 Claims, 5 Drawing Sheets

(51) Int. Cl.
*G06N 20/00* (2019.01)
*G06F 16/583* (2019.01)
*G06F 16/532* (2019.01)
*G06F 16/56* (2019.01)
*G06F 18/22* (2023.01)
*G06V 30/146* (2022.01)
*G06V 30/10* (2022.01)

(52) U.S. Cl.
CPC .......... *G06F 16/5846* (2019.01); *G06F 18/22* (2023.01); *G06N 20/00* (2019.01); *G06V 30/147* (2022.01); *G06V 30/10* (2022.01); *G06V 2201/09* (2022.01)

(56) References Cited

U.S. PATENT DOCUMENTS

| | | | | |
|---|---|---|---|---|
| 10,600,060 | B1* | 3/2020 | Schiffman | G06Q 30/0201 |
| 10,864,552 | B2* | 12/2020 | Shoji | H04M 19/04 |
| 10,864,571 | B2* | 12/2020 | Hug | B68G 9/00 |
| 2009/0173791 | A1* | 7/2009 | Pine | A61B 90/90 |
| | | | | 235/454 |
| 2015/0023604 | A1* | 1/2015 | Mitchell | G06V 30/412 |
| | | | | 382/217 |
| 2016/0044203 | A1* | 2/2016 | Paul | H04N 1/001 |
| | | | | 705/5 |
| 2018/0307942 | A1* | 10/2018 | Pereira | G06F 18/24 |
| 2019/0333478 | A1* | 10/2019 | Mott | G06V 20/10 |
| 2020/0090007 | A1* | 3/2020 | Joseph | G06V 30/248 |
| 2020/0257922 | A1* | 8/2020 | Huang | G06V 30/224 |
| 2020/0356818 | A1* | 11/2020 | Attorre | G06F 18/2148 |
| 2021/0124919 | A1* | 4/2021 | Balakrishnan | G06F 21/64 |
| 2021/0224582 | A1* | 7/2021 | Afshar | G06F 18/22 |
| 2021/0303939 | A1* | 9/2021 | Hu | G06N 3/045 |

OTHER PUBLICATIONS

Image-Matching Based Identification of Store Signage Using Web-Crawled Information, Chenyi Liao et al., IEEEAccess, 2018, pp. 45590-45605 (Year: 2018).*

Con-Text: Text Detection for Fine-Grained Object Classification, Sezer Karaoglu et al., IEEE, 2017, pp. 3967-3980 (Year: 2017).*

Extended European Search Report of European patent application No. 21186141.4 dated Dec. 22, 2021, 9 pages.

Karaoglu et al., "Con-Text: Text Detection for Fine-Grained Object Classification", IEEE Transactions on Image Processing, IEEE, USA, vol. 26, No. 8, Aug. 1, 2017 (Aug. 1, 2017), pp. 3965-3980, XP011653027, ISSN: 1057-7149, DOI: 10.1109/TIP.2017.2707805, [retrieved on Jun. 13, 2017].

* cited by examiner

LOGO PICTURE PROCESSING METHOD, APPARATUS, DEVICE AND MEDIUM

CROSS-REFERENCE TO RELATED APPLICATIONS

The present application claims the priority of Chinese Patent Application No. 202011558007.7, filed on Dec. 25, 2020, with the title of "Logo picture processing method, apparatus, electronic device and media." The disclosure of the above application is incorporated herein by reference in its entirety.

TECHNICAL FIELD

The present disclosure relates to technical field of image processing, and specifically to the technical field of artificial intelligence such as deep learning and computer vision, and particularly to a logo picture processing method, apparatus, device and medium.

BACKGROUND

Artificial intelligence is a branch of science concerned with using a computer to simulate a human being's some thinking processes and intelligent behaviors (e.g., learning, reasoning, thinking, planning etc.) and integrates techniques at the hardware level and techniques at the software level. Artificial intelligence hardware techniques generally include sensors, dedicated artificial intelligence chips, cloud computing, distributed storage, big data processing etc. Artificial intelligence software techniques mainly include major aspects such as compute vision technique, speech recognition technique, natural language processing technique, machine learning/deep learning, big data processing technique, and knowledge graph technique.

A log, referred to as a mark, an emblem or trademark, is a kind of visual and definite visualized information. When a log picture is recognized, picture matching is generally first performed, and then information regarding the matched picture is obtained as a recognition result.

In relevant technologies, picture matching is performed only according to features of a logo graph, for example, the shape and color of the logo graph.

SUMMARY

The present disclosure provides a logo picture processing method, apparatus, device and medium.

According to an aspect of the present disclosure, there is provided a logo picture processing method, including: obtaining a logo picture including: a current logo graph and current text information; performing text recognition on the logo picture to obtain the current text information; searching for a picture that matches both the current logo graph and the current text information, to obtain a matched picture.

According to another aspect of the present disclosure, there is provided an electronic device including at least one processor; and a memory communicatively connected with the at least one processor; wherein the memory stores instructions executable by the at least one processor, and the instructions are executed by the at least one processor to enable the at least one processor to perform a logo picture processing method, wherein the method comprises, including: obtaining a logo picture including: a current logo graph and current text information; performing text recognition on the logo picture to obtain the current text information; searching for a picture that matches both the current logo graph and the current text information, to obtain a matched picture.

According to a further aspect of the present disclosure, there is provided a non-transitory computer readable storage medium with computer instructions stored thereon, wherein the computer instructions are used for causing a computer to perform a logo picture processing method, wherein the method includes obtaining a logo picture including: a current logo graph and current text information; performing text recognition on the logo picture to obtain the current text information; searching for a picture that matches both the current logo graph and the current text information, to obtain a matched picture.

According to technical solutions of the present disclosure, the accuracy of recognizing logo pictures may be improved.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

In relevant technologies, when a log picture is recognized, picture matching is performed only according to features of the logo graph, e.g., the shape, color or the like of the logo graph. Text information in the logo picture is not considered upon picture matching, which will cause a logo picture having a similar logo graph but a completely different text to be mistakenly regarded as being matched, thereby reducing the recognition accuracy.

In order to solve the aforementioned problem of low logo picture recognition accuracy, the present disclosure provides the following embodiments.

Figure 1:
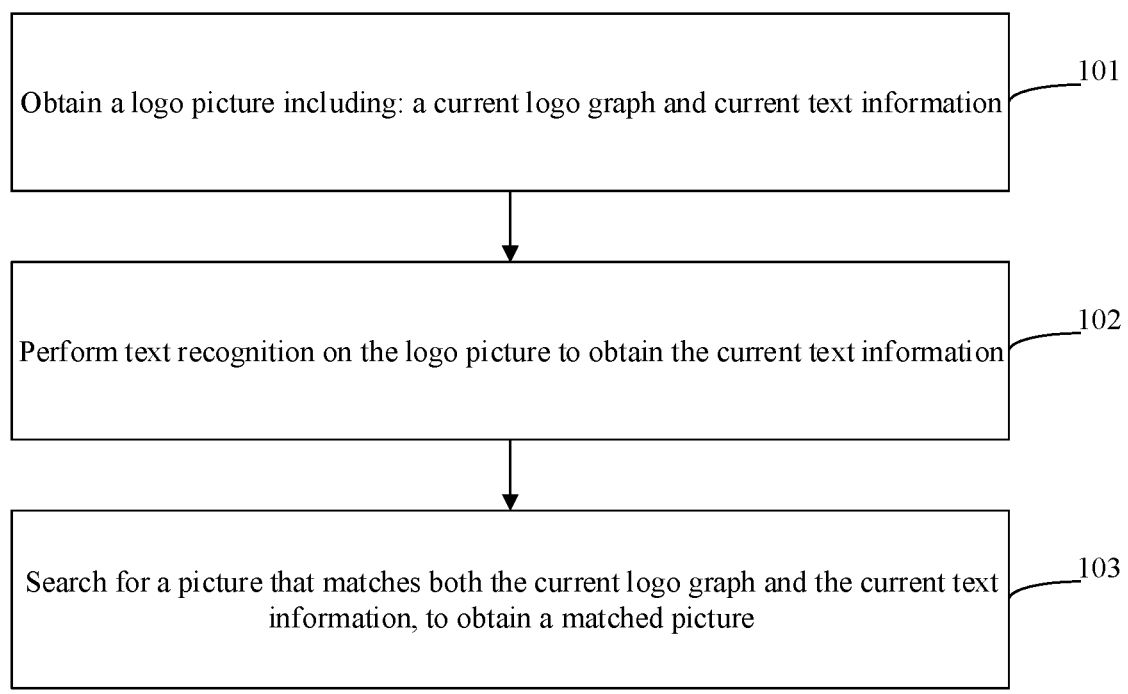
FIG. 1 illustrates a schematic diagram of a first embodiment according to the present disclosure.

FIG. 1 illustrates a schematic diagram of a first embodiment according to the present disclosure. The present embodiment provides a logo picture processing method, comprising:

101: obtaining a logo picture including: a current logo graph and current text information.

102: performing text recognition on the logo picture to obtain the current text information.

103: searching for a picture that matches both the current logo graph and the current text information to obtain a matched picture.

Generally speaking, when the user interacts with a logo picture processing system, the user inputs an original picture into the logo picture processing system. The original picture refers to a picture that contains not only the graph and text information of the logo, but also other background information.

In order to reduce the influence of background information and improve recognition efficiency and accuracy, the logo picture processing system may process the original picture after receiving it to obtain the logo picture.

Figure 2:
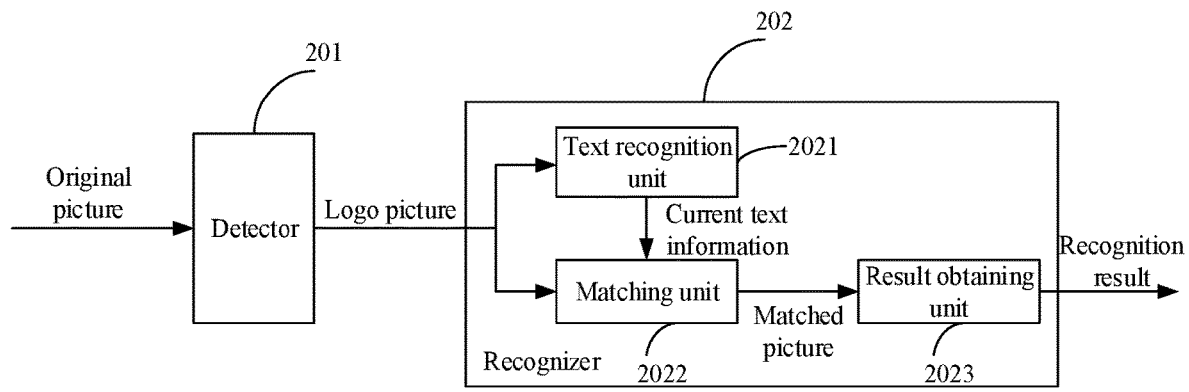
FIG. 2 illustrates a schematic diagram of a second embodiment according to the present disclosure.

For example, referring to FIG. 2, the detector 201 may be used to determine a logo area in the original picture, and crop, from the original picture, a picture corresponding to the logo area, as the logo picture. Among them, the detector may be obtained after training based on training data. For example, the training data includes a sample picture and corresponding label data. The label data is area information of the sample picture. The area information may be obtained by manual labeling or in other manners. Therefore, a detector may be obtained after training based on the training data. The input and output of the detector are the picture and the log area information, respectively. Therefore, the detector may be used to determine the logo area of the original picture. After that, cropping may be performed based on the logo area to obtain the logo picture.

In the present embodiment, by cropping the original picture to obtain the logo picture, the influence of useless noise may be removed, and the recognition efficiency and accuracy may be improved.

As shown in FIG. 2, after the logo picture is obtained, it may be input into a recognizer 202 for recognition to obtain a recognition result. It may be appreciated that since what is processed is a picture in a standard size, the log picture, before being input to the recognizer, may be first enlarged to a standard size, and then the logo picture in the standard size be input to the recognizer. The log picture is enlarged for example by using bilinear interpolation.

It needs to be appreciated that the above-mentioned logo area refers to an area containing the logo graph and the corresponding text information, rather than an area containing only the logo graph.

Figure 3:
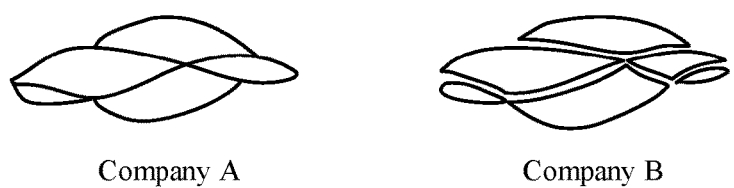
FIG. 3 illustrates a schematic diagram of two logo pictures to be matched in an embodiment according to the present disclosure.

Refer to FIG. 3, it shows two logo pictures which have similar graphs but have completely different text information. If the two log pictures are recognized by using a relevant technique, it will be believed that the two log pictures are matched pictures, thereby causing wrong picture matching. Further, a wrong recognition result is obtained according to the wrong matched picture, so that the log picture recognition accuracy is affected.

In the present embodiment, referring to FIG. 2, after the recognizer 202 receives the logo picture, it may divide the logo picture into two paths. For example, referring to FIG. 2, one path is sent to a text recognition unit 2021 to obtain current text information, and the other path is sent to a matching unit 2022 to match candidate pictures in a pre-stored picture library according to the logo picture and the current text information output by the text recognition unit, to obtain a matched picture.

The recognizer 202 may further include a result obtaining unit 2023 by which relevant information of the matched picture is obtained as a recognition result. The recognition result includes, for example: a matched picture; and/or a tag corresponding to the matched picture. In addition to pictures, tags corresponding to the pictures may be pre-stored in the picture library. The tags are used to describe the pictures, e.g., picture classes (e.g., people, plants, landmarks, etc.), picture size, picture name, brief descriptive information of the pictures, etc.

In the present embodiment, by obtaining the recognition result according to the matched picture, the recognition result of the logo picture may be obtained, and the recognition of the logo picture is completed.

In the present embodiment, upon picture matching, the matching accuracy may be improved and thereby the recognition accuracy of the logo picture be improved by considering the logo graphs as well as the text information corresponding to the logo graphs as compared with considering the log graphs only.

Figure 4:
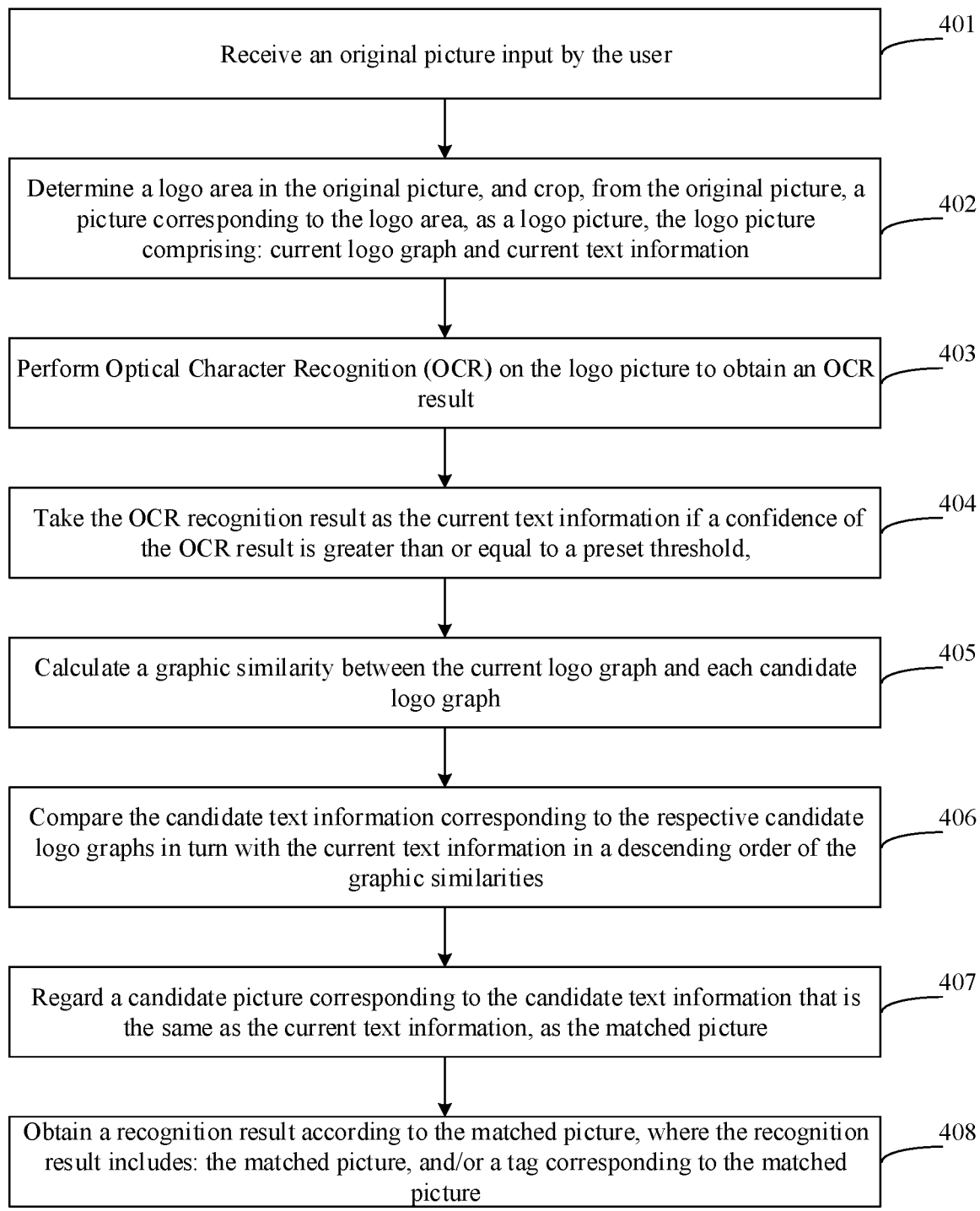
FIG. 4 illustrates a schematic diagram of a third embodiment according to the present disclosure.

FIG. 4 is a schematic diagram of a third embodiment of the present disclosure. The present embodiment improves a logo picture processing method. As shown in FIG. 4, the method comprises:

401: receiving an original picture input by the user.

402: determining a logo area in the original picture, and cropping, from the original picture, a picture corresponding to the logo area, as a logo picture, the logo picture comprising: current logo graph and current text information.

403: performing Optical Character Recognition (OCR) on the logo picture to obtain an OCR result.

404: taking the OCR recognition result as the current text information if a confidence of the OCR result is greater than or equal to a preset threshold.

405: calculating a graphic similarity between the current logo graph and each candidate logo graph, wherein the candidate logo graph corresponds to a candidate picture, there is at least one candidate picture which is pre-stored in the picture library, and the candidate picture further includes candidate text information corresponding to the candidate logo graph.

406: comparing the candidate text information corresponding to the respective candidate logo graphs in turn with the current text information in a descending order of the graphic similarities.

407: regarding a candidate picture corresponding to the candidate text information that is the same as the current text information, as the matched picture.

408: obtaining a recognition result according to the matched picture, where the recognition result includes: the matched picture, and/or a tag corresponding to the matched picture.

Regarding 401-402:

Reference may be made to the relevant depictions in the previous embodiment.

Regarding 403-404:

Various relevant OCR modules may be employed to recognize the logo picture to obtain the OCR result. Upon recognizing, the OCR module may also determine the confidence of the OCR result. If the confidence is greater than or equal to a preset threshold (such as 0.8), the OCR result is taken as a final text recognition result, namely, the current text information to be obtained.

In the present embodiment, by taking the OCR result with the confidence greater than or equal to the preset threshold as the current text information finally employed, the accuracy of the current text information may be improved, and thus the accuracy of the logo recognition result may be improved.

Regarding 405-407:

In some embodiments, each candidate feature vector corresponding to each candidate logo graph is pre-stored in the picture library; the calculating a graphic similarity between the current logo graph and each candidate logo graph comprises: extracting a current feature vector of the current log graph; respectively calculating distance values between the current feature vector and the candidate feature vectors, and determining the graph similarities according to the distance values.

A pre-trained deep neural network model may be used to extract the feature vector of the logo picture. The deep neural network is, for example, a convolutional neural network. The extraction of the feature vector of the picture through the convolutional neural network may be achieved by using a relevant technique, and will not be described in detail here.

After the current feature vector is obtained, the distance values between the current feature vector and the candidate feature vectors may be calculated, e.g., a Euclidean distance value between two sets of feature vectors may be calculated. The smaller the distance value is, the larger the graphic similarity is.

It is possible to, after the distance values are calculated, compare the candidate text information corresponding to the candidate log graphs with the current text information in turn in an ascending order of the distance values, i.e., in a descending order of the graphic graphics, until the candidate text information identical with the current text information is found, and the corresponding candidate graph is taken as the matched picture.

For example, arranging in a descending order of the graphic similarities is in turn: a first candidate logo graph and corresponding first candidate text information; a second candidate logo graph and corresponding second candidate text information, etc., if it is found after the comparison, the first candidate text information is different from the current text information, whereas the second candidate text information is the same as the current text information, the candidate picture corresponding to the second candidate logo graph and the second candidate text information is regarded as the matched picture.

It may be appreciated that the above-mentioned candidate text information is the same as the current text information in a broad sense, including completely the same or partially the same as the current text information. In most cases, for the matched logo picture, its candidate text information is completely the same as the current text information. However, the embodiment of the present disclosure does not exclude special cases, that is, in some cases, the two information is not completely the same. For example, if one information is company A and the other is A, the two information may also be considered the same. That is, upon matching, preferably a candidate picture completely the same as the text information may be selected; if the candidate picture completely the same as the text information does not exist, a candidate picture partially the same as the text information may be selected In the present embodiment, matching is performed for the text information in a descending order of the graphic similarities, to find the most similar log graph when the same as the text information, thereby improving the matching degree.

In the present embodiment, the accuracy in calculating the graphic similarities may be improved by calculating the distance value based on the feature vector corresponding to the logo graph, and determining the graphic similarity according to the distance value.

Regarding 408:

As described in the previous embodiment, the tags of the pictures may also be pre-stored in the picture library corresponding to the pictures. The tags are for example picture class, picture name and so on.

In addition, when the above-mentioned processing method is applied to a search scene, the user may input the original picture as into the system as a query, and the system obtains the recognition result after the above-mentioned processing, and then the system returns the recognition result to the user as a search result.

In the present embodiment, since the matched picture is accurate, it is possible to, by obtaining the recognition result according to the matched picture, obtain an accurate recognition result, and improve the accuracy of the recognition result. In addition, the recognition result may also be fed back to the user as the search result, and may be applied to the user's search scenario. Furthermore, since the accuracy of the recognition result is improved, the user's satisfaction may be improved.

Figure 5:
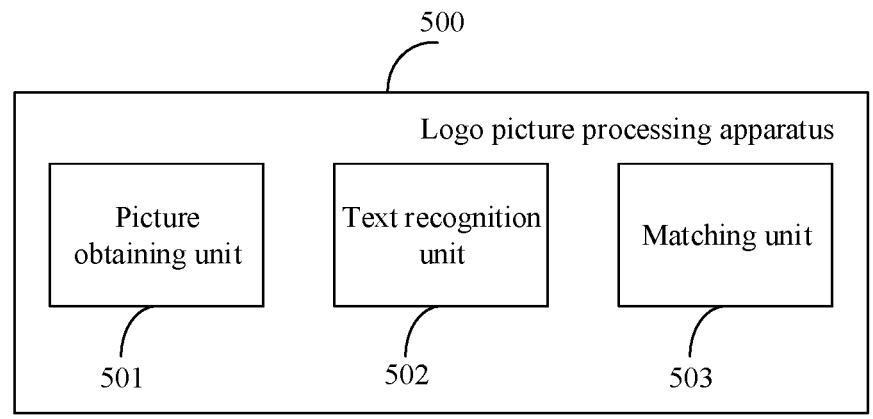
FIG. 5 illustrates a schematic diagram of a fourth embodiment according to the present disclosure.

FIG. 5 illustrates a schematic diagram of a fourth embodiment according to the present disclosure. The present embodiment provides a logo picture processing apparatus. As shown in FIG. 5, the apparatus 500 comprises a picture obtaining unit 501, a text recognition unit 502 and a matching unit 503.

The picture obtaining unit 501 is configured to obtain a logo picture including: a current logo graph and current text information; the text recognition unit 502 is configured to perform text recognition on the logo picture to obtain the current text information; the matching unit 503 is configured to search for a picture that matches both the current logo graph and the current text information to obtain a matched picture.

In some embodiments, the picture obtaining unit 501 is specifically configured to: determine a logo area in an original picture; crop, from the original picture, a picture corresponding to the logo area, as the logo picture.

In some embodiments, the text recognition unit 502 is specifically configured to: perform Optical Character Recognition (OCR) on the logo picture to obtain an OCR result; take the OCR recognition result as the current text information if a confidence of the OCR result is greater than or equal to a preset threshold.

Figure 6:
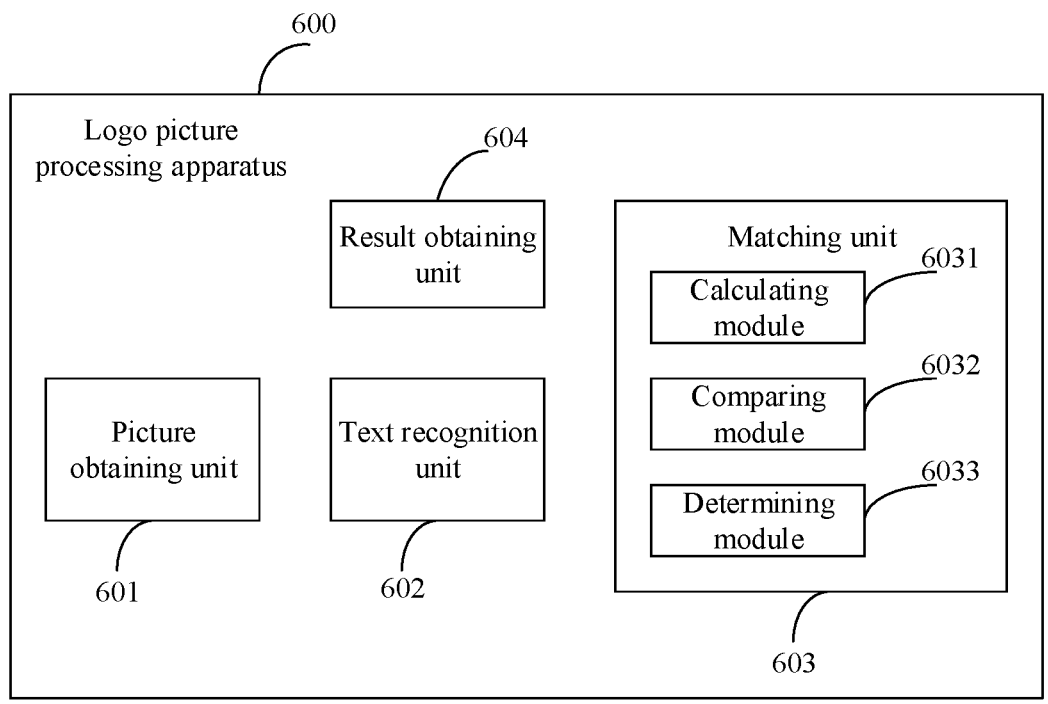
FIG. 6 illustrates a schematic diagram of a fifth embodiment according to the present disclosure.

In some embodiments, at least one candidate picture is pre-stored in the picture library, and the candidate picture comprises: a candidate logo graph and candidate text information. As shown in FIG. 6, there is provided a log picture processing apparatus. The logo picture processing apparatus 600 comprises a picture obtaining unit 601, a text recognition unit 602 and a matching unit 603. The matching unit 603 comprises a calculating module 6031, a comparing module 6032 and a determining module 6033. The calculating module 6031 is configured to calculate a graphic similarity between the current logo graph and each candidate logo graph; the comparing module 6032 is configured to compare the candidate text information corresponding to the respective candidate logo graphs in turn with the current text information in a descending order of the graphic similarities;

the determining module 6033 is configured to regard a candidate picture corresponding to the candidate text information that is the same as the current text information, as the matched picture.

In some embodiments, each candidate feature vector corresponding to each candidate logo graph is pre-stored in the picture library; the calculating module 6031 is specifically configured to: extract a current feature vector of the current log graph; respectively calculate distance values between the current feature vector and the candidate feature vectors, and determine the graph similarities according to the distance values.

In some embodiments, as shown in FIG. 6, the apparatus further comprises: a result obtaining unit 604 configured to obtain a recognition result according to the matched picture, the recognition result including: the matched picture, and/or a tag corresponding to the matched picture.

In the embodiments of the present disclosure, by cropping the original picture to obtain the logo picture, the influence of useless noise may be removed, and the recognition efficiency and accuracy may be improved. Upon picture matching, the matching accuracy may be improved and thereby the recognition accuracy of the logo picture be improved by considering the logo graphs as well as the text information corresponding to the logo graphs as compared with considering the log graphs only. By taking the OCR result with the confidence greater than or equal to the preset threshold as the current text information finally employed, the accuracy of the current text information may be improved, and thus the accuracy of the logo recognition result may be improved. Matching is performed for the text information in a descending order of the graphic similarities, to find the most similar log graph when the same as the text information, thereby improving the matching degree. The accuracy in calculating the graphic similarities may be improved by calculating the distance value based on the feature vector corresponding to the logo graph, and determining the graphic similarity according to the distance value. Since the matched picture is accurate, it is possible to, by obtaining the recognition result according to the matched picture, obtain an accurate recognition result, and improve the accuracy of the recognition result. In addition, the recognition result may also be fed back to the user as the search result, and may be applied to the user's search scenario. Furthermore, since the accuracy of the recognition result is improved, the user's satisfaction may be improved.

It may be appreciated that the same or corresponding content in different embodiments of the present disclosure may be referenced between each other, and reference may be made to related content of other embodiments, for the content not described in detail in the embodiments.

According to embodiments of the present disclosure, the present disclosure further provides an electronic device, a readable storage medium and a computer program product.

Figure 7:
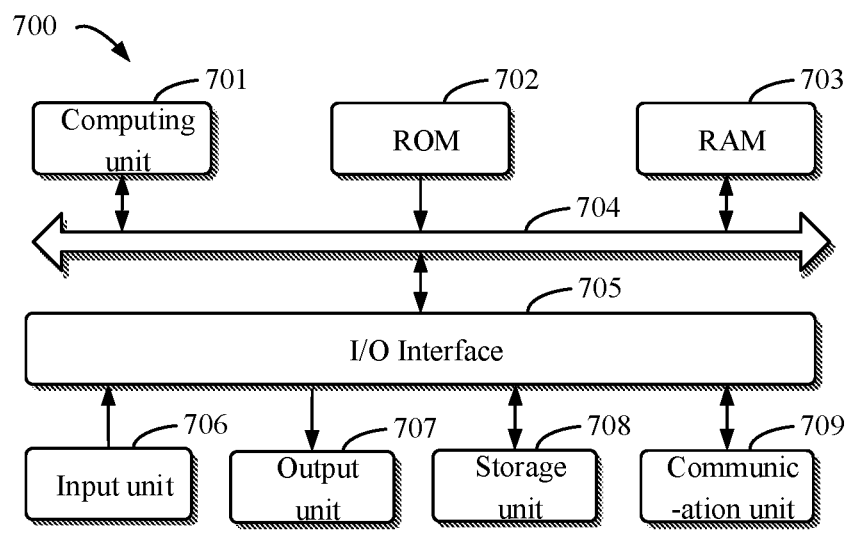
FIG. 7 illustrates a schematic diagram of an electronic device for implementing a log recognition method according to embodiments of the present disclosure.

FIG. 7 illustrates a schematic diagram of an electronic device 700 for implementing embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 7, the device 700 comprises a computing unit 701 that may perform various appropriate actions and processing based on computer program instructions stored in a read-only memory (ROM) 702 or computer program instructions loaded from a storage unit 708 to a random access memory (RAM) 703. In the RAM 703, there further store various programs and data needed for operations of the device 700. The computing unit 701, ROM 702 and RAM 703 are connected to each other via a bus 704. An input/output (I/O) interface 705 is also connected to the bus 704.

Various components in the device 700 are connected to the I/O interface 705, including: an input unit 706 such as a keyboard, a mouse and the like; an output unit 707 including various kinds of displays and a loudspeaker, etc.; a storage unit 708 including a magnetic disk, an optical disk, and etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

The computing unit 701 may be various general-purpose and/or special-purpose processing components with processing and computing capabilities. Some examples of computing unit 701 include, but are not limited to, Central Processing Unit (CPU), Graphics Processing Unit (GPU), various dedicated artificial intelligence (AI) computing chips, various computing units that run machine learning model algorithms, Digital Signal Processing (DSP), and any appropriate processor, controller, microcontroller, etc. The computing unit 701 executes various methods and processes described above, such as the log recognition method. For example, in some embodiments, the log recognition method may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of the log recognition method described above may be executed. Alternatively, in other embodiments, the computing unit 701 may be configured in any other suitable manner (for example, with the aid of firmware) to execute the log recognition method.

Various implementations of the system and technology described above in the text may be implemented in a digital electronic circuit system, an integrated circuit system, a Field-Programmable Gate Array (FPGA), an Application Specific Integrated Circuit (ASIC), an Application Specific Standard Parts (ASSP), System on Chip (SOC), Complex Programmable Logic Device (CPLD), computer hardware, firmware, software and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

The computer program code for implementing the method of the subject matter described herein may be complied with one or more programming languages. These computer program codes may be provided to a general-purpose computer, a dedicated computer or a processor or controller of other programmable data processing apparatuses, such that when the program codes are executed by the processor or controller, the functions/operations prescribed in the flow chart and/or block diagram are caused to be implemented. The program code may be executed completely on a computer, partly on a computer, partly on a computer as an independent software packet and partly on a remote computer, or completely on a remote computer or server.

In the context of the subject matter described herein, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, a hard drive, a Random-Access Memory (RAM), a Read-Only Memory (ROM), an Erasable Programmable Read-Only Memory (EPROM or flash memory), an optical fiber, a Portable Compact Disc Read-Only Memory (CD-ROM), an optical storage device, a magnetic storage device, or any appropriate combination thereof.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a Local Area Network (LAN), a Wide Area Network (WAN), and the Internet.

The computing system may include clients and servers. A client and server are generally remote from each other and typically interact through a communication network. The relationship of client and server arises by virtue of computer programs running on the respective computers and having a client-server relationship to each other. The server may be a cloud server, also referred to as a cloud computing server or a cloud host, and is a host product in a cloud computing service system to address defects such as great difficulty in management and weak service extensibility in a traditional physical host and VPS (Virtual Private Server). The server may also be a server of a distributed system, or a sever combined with a block chain.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented logo picture processing method, comprising:
    obtaining a logo picture including: a current logo graph and current text information;
    performing text recognition on the logo picture to obtain the current text information; and
    searching for a picture that matches both the current logo graph and the current text information, to obtain a matched picture,
    wherein at least one candidate picture is pre-stored in a picture library, and the candidate picture comprises: a candidate logo picture and candidate text information, and the searching for a picture that matches both the current logo graph and the current text information, to obtain a matched picture comprises:
    calculating a graphic similarity between the current logo graph and each candidate logo graph;
    comparing the candidate text information corresponding to the respective candidate logo graphs in turn with the current text information in a descending order of the graphic similarities; and
    regarding a candidate picture corresponding to the candidate text information that is the same as the current text information, as the matched picture.

2. The method according to claim 1, wherein each candidate feature vector corresponding to each candidate logo graph is pre-stored in the picture library, and the calculating a graphic similarity between the current logo graph and each candidate logo graph comprises:
    extracting a current feature vector of the current log graph;
    respectively calculating distance values between the current feature vector and the candidate feature vectors, and determining the graph similarities according to the distance values.

3. The method according to claim 1, wherein the obtaining a logo picture comprises:
    determining a logo area in an original picture;
    cropping, from the original picture, a picture corresponding to the logo area, as the logo picture.

4. The method according to claim 1, wherein the performing text recognition on the logo picture to obtain the current text information comprises:
    performing Optical Character Recognition (OCR) on the logo picture to obtain an OCR result; and
    taking the OCR recognition result as the current text information if a confidence of the OCR result is greater than or equal to a preset threshold.

5. The method according to claim 1, further comprising:
obtaining a recognition result according to the matched picture, the recognition result including: the matched picture, and/or a tag corresponding to the matched picture.

6. The method according to claim 2, further comprising:
obtaining a recognition result according to the matched picture, the recognition result including: the matched picture, and/or a tag corresponding to the matched picture.

7. The method according to claim 3, further comprising:
obtaining a recognition result according to the matched picture, the recognition result including: the matched picture, and/or a tag corresponding to the matched picture.

8. The method according to claim 4, further comprising:
obtaining a recognition result according to the matched picture, the recognition result including: the matched picture, and/or a tag corresponding to the matched picture.

9. An electronic device, comprising:
at least one processor; and
a memory communicatively connected with the at least one processor;
wherein the memory stores instructions executable by the at least one processor, and the instructions are executed by the at least one processor to enable the at least one processor to perform a logo picture processing method, wherein the method comprises:
obtaining a logo picture including: a current logo graph and current text information;
performing text recognition on the logo picture to obtain the current text information; and
searching for a picture that matches both the current logo graph and the current text information, to obtain a matched picture,
wherein at least one candidate picture is pre-stored in a picture library, and the candidate picture comprises: a candidate logo picture and candidate text information, and the searching for a picture that matches both the current logo graph and the current text information, to obtain a matched picture comprises:
calculating a graphic similarity between the current logo graph and each candidate logo graph;
comparing the candidate text information corresponding to the respective candidate logo graphs in turn with the current text information in a descending order of the graphic similarities; and
regarding a candidate picture corresponding to the candidate text information that is the same as the current text information, as the matched picture.

10. The electronic device according to claim 9, wherein each candidate feature vector corresponding to each candidate logo graph is pre-stored in the picture library, and the calculating a graphic similarity between the current logo graph and each candidate logo graph comprises:
extracting a current feature vector of the current log graph; and
respectively calculating distance values between the current feature vector and the candidate feature vectors, and determining the graph similarities according to the distance values.

11. The electronic device according to claim 9, wherein the obtaining a logo picture comprises:
determining a logo area in an original picture;
cropping, from the original picture, a picture corresponding to the logo area, as the logo picture.

12. The electronic device according to claim 9, wherein the performing text recognition on the logo picture to obtain the current text information comprises:
performing Optical Character Recognition (OCR) on the logo picture to obtain an OCR result; and
taking the OCR recognition result as the current text information if a confidence of the OCR result is greater than or equal to a preset threshold.

13. The electronic device according to claim 9, further comprising:
obtaining a recognition result according to the matched picture, the recognition result including: the matched picture, and/or a tag corresponding to the matched picture.

14. The electronic device according to claim 10, further comprising:
obtaining a recognition result according to the matched picture, the recognition result including: the matched picture, and/or a tag corresponding to the matched picture.

15. A non-transitory computer readable storage medium with computer instructions stored thereon, wherein the computer instructions are used for causing a computer to perform a logo picture processing method, wherein the method comprises:
obtaining a logo picture including: a current logo graph and current text information;
performing text recognition on the logo picture to obtain the current text information; and
searching for a picture that matches both the current logo graph and the current text information, to obtain a matched picture,
wherein at least one candidate picture is pre-stored in a picture library, and the candidate picture comprises: a candidate logo picture and candidate text information, and the searching for a picture that matches both the current logo graph and the current text information, to obtain a matched picture comprises:
calculating a graphic similarity between the current logo graph and each candidate logo graph;
comparing the candidate text information corresponding to the respective candidate logo graphs in turn with the current text information in a descending order of the graphic similarities; and
regarding a candidate picture corresponding to the candidate text information that is the same as the current text information, as the matched picture.

* * * * *